Figure 1:
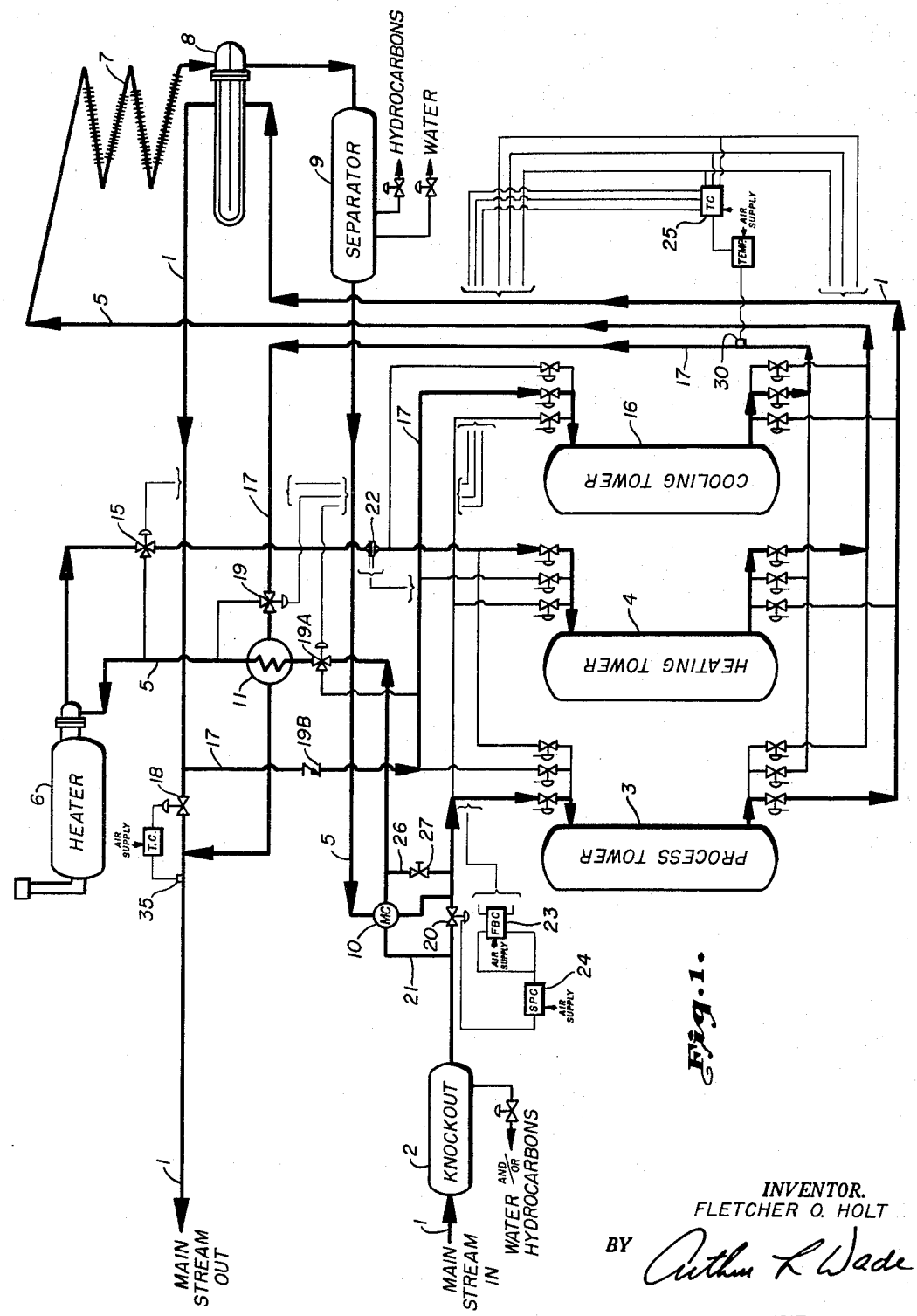

INVENTOR.
FLETCHER O. HOLT
BY Arthur L Wade
ATTORNEY

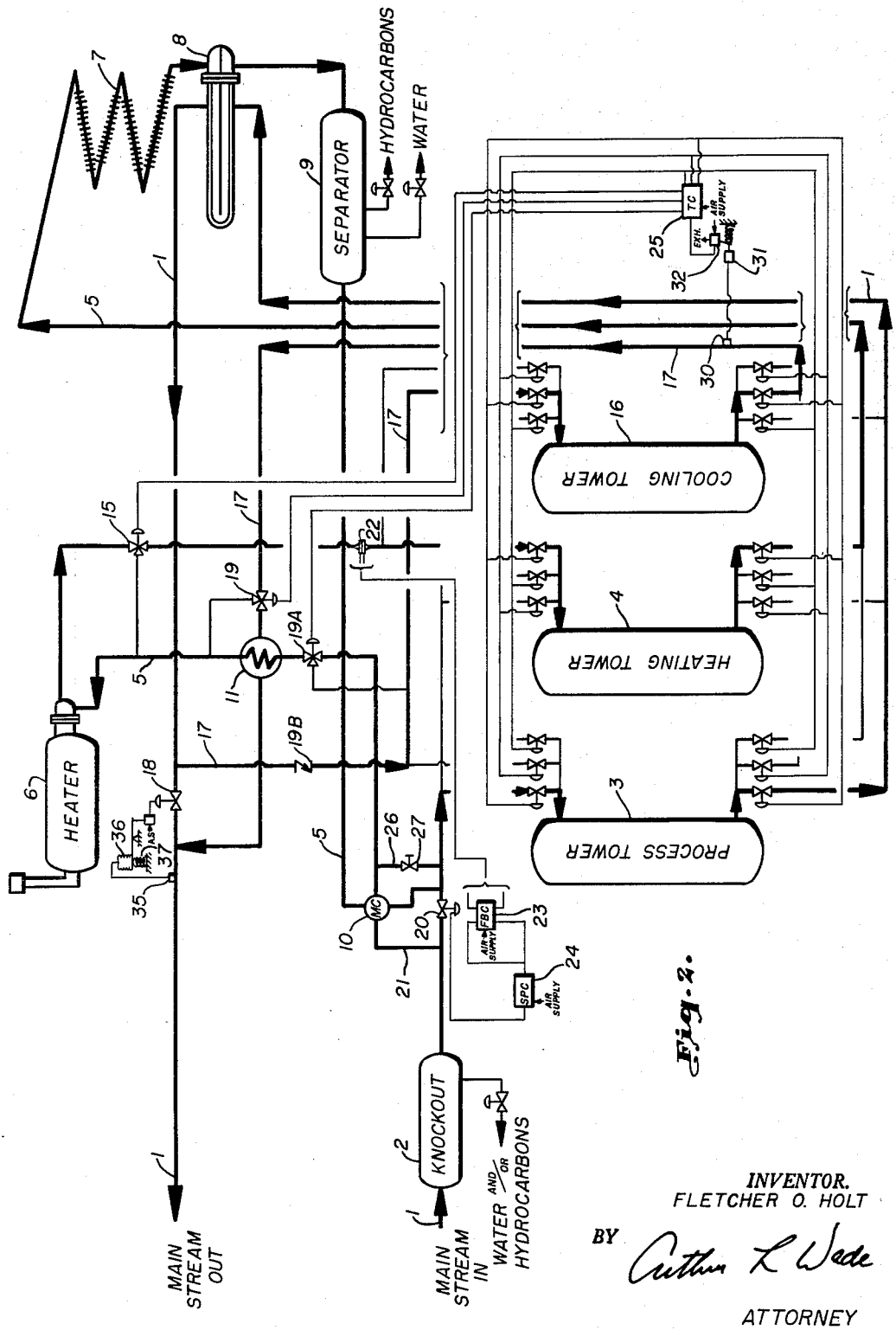

3,238,701
PROCESS AND APPARATUS FOR RECOVERING HYDROCARBONS FROM GAS STREAMS
Fletcher O. Holt, Tulsa, Okla., assignor to National Tank Company, Tulsa, Okla., a corporation of Nevada
Continuation of application Ser. No. 110,259, May 15, 1961. This application Sept. 15, 1964, Ser. No. 398,833
8 Claims. (Cl. 55—20)

This application is a continuation of Serial No. 110,259, filed May 15, 1961, now abandoned.

This invention relates to the operation of a three-bed adsorption system for processing a stream of natural gas. More specifically, the invention relates to cycling the three-beds of the adsorption system so as to extract the maximum of heavy hydrocarbon ends from the main stream.

The advantages of a three-bed adsorption system for extracting condensable hydrocarbons from a stream of natural gas are well known. Compared to two-bed systems, the three-bed system attains double the exposure rate of adsorbent to recoverable constituents.

Further, it is well known that the three-bed system has a tremendous advantage over the two-bed system by making it convenient to utilize processed gas to cool the regenerated bed and thereby reduce the shifting load of sorbate between the beds of the system. In general, it is well known to shift a bed on adsorption service on the main stream into the heated regeneration stream and then into a circuit utilizing tail gas. However, when a bed is shifted from the heated regeneration stream, with its high content of heavy, liquefiable hydrocarbons, these hydrocarbons pass from the unit when the bed is cooled with tail gas, raising the hydrocarbon dew point of the main gas stream passed from the unit. Where purchasers of the processed gas specify a specific hydrocarbon dew point for the gas they purchase, the three-bed adsorption system, with its tail gas cooling, has its advantages overshadowed by the fact that the heated regeneration tower will pass its charge of heavy hydrocarbon ends downstream of the adsorption system when the heated regenerated bed is cooled by tail gas and raise the hydrocarbon dew point.

The principal object of the present invention is to prevent loss of heavy ends of hydrocarbons downstream of a three-bed adsorption system in which the hot regenerated bed is cooled by tail gas.

Another object is to purge heavy ends of hydrocarbons from the hot regenerated tower of the three-bed adsorption system without interrupting the heating phase of regeneration carried out at the same time in a three-bed adsorptive system.

Another object is to use the regeneration circuit of a three-bed adsorption system to simultaneously heat one of the beds and purge heavy ends of hydrocarbons from a heated bed, the heavy ends having been left in the bed by the heating prior to cooling the purged bed with tail gas to prepare the bed for return to adsorption service.

The invention contemplates a three-bed adsorption system in which one bed is used to adsorb while another of the remaining two beds is heated as the third bed is cooled to prepare the beds to a return to adsorption service. As each bed is brought up to temperature, it is connected to the cool portion of the regeneration circuit coming from the separator and going to the heater. The bed is left in the circuit long enuogh to be purged of the heavy ends of hydrocarbons which were in the heated regeneration gas with which the tower was charged. The purged bed is then connected into the cooling circuit provided tail gas from the adsorption bed to bring the bed down to working adsorption temperature without loss of the heavy hydrocarbons to the tail gas.

Other objects, advantages and features of this invention will become apparent to one skilled in the art upon consideration of the written specification, appended claims, and attached drawings, wherein:

FIG. 1 is a diagrammatic and schematic representation of a system, having three beds of adsorbent with which the method of the invention is practiced; and FIG. 2 is the system of FIG. 1, with the control features of FIG. 1 illustrated in greater detail.

GENERAL PLAN OF THE DISCLOSURE

There are two basic difficulties in disclosing the preferred embodiment of the present invention. Although the system in which the invention is embodied is represented both diagrammatically and schematically, for simplicity, the drawings of the conduits interconnecting the various pieces of apparatus form a maze of lines in which the process is difficult to follow without exhaustive study. Secondly, the representation of the instrumentation and control apparatus is also complex, even when considered separately from the conduits. Placing both the process conduits and the control piping on the same diagram proved very difficult to do with clarity.

To meet the first problem of representation, FIG. 1 of the drawing has been developed to show the conduits to carry out the process with the locations of the instrumentation and control apparatus indicated with extreme simplicity. To meet the second problem, FIG. 2 of the drawing has been developed to show the measuring and control apparatus in greater detail, interconnected to carry out their function. In making the instrumentation and control connections continuous in FIG. 2, the conduits of the process have been broken at points which appear desirable to give clarity.

FIGS. 1 and 2, then, are to be considered together in illustrating the process conduits and the instrumentation and control piping for a three-bed system utilizing the present invention.

The process.—Adsorption

FIG. 1 is a flow diagram of a system employing a dry desiccant to process a stream of natural gas. The stream is brought to the process by means of conduit 1. The various pieces of processing apparatus are included in this conduit 1 receiving its stream. After the processing, this main stream of gas is removed through conduit 1. The first piece of apparatus shown as included in conduit 1 is an inlet separator, or knockout, 2. At a particular temperature and particular pressure, a specific stream of natural gas to be processed may have liquids mechanically entrained therein. Knockout 2 is designed to mechanically scrub these mechanically entrained liquids, generally classified as water and/or hydrocarbons, from the stream.

Conduit 1 is next illustrated as having a valve therein with which to produce a regulated pressure drop with which to force part of the main stream through the driving section of a motor-compressor. The entire main stream is next passed through one of the three towers disclosed for contact with the bed of adsorbent material for adsorption of condensable liquids from the stream of natural gas.

A valved manifold directs the gas of the main stream through each of the towers in a predetermined sequence. A similar manifold receives the gas of the main stream from the towers and passes the gas to a heat exchanger before the processed gas is discharged to a point of use. In these tower manifolds for the main stream of gas, the branch going to tower 3, and coming from tower 3, is shown in the heavier line. This heavy-line convention is used to indicate that the tower 3 is the one of the three towers processing the natural gas in the system as represented. Tower 3 is suitably legended to additionally emphasize its function at this stage of the process illustrated.

The process.—Bed heating and liquid recovery

It is to be assumed that tower 4 previously processed the main stream, removing therefrom liquefiable hydrocarbons and water. In order to now remove these components from the adsorbent material, it is heated. A convenient means for heating tower 4 is to conduct a heated stream of gas therethrough. The circuit for this heating gas is characterized by conduit 5.

Conduit 5 is illustrated as a closed circuit containing gas which is passed through heater 6 before it is passed through tower 4. A second valved manifold is provided for conducting the heating gas to each of the three towers as desired. Also, a manifold on the discharge of the three towers removes the regeneration gas and directs it through a cooling means. Atmospheric cooler 7 is first illustrated, the regeneration gas being next conducted to heat exchanger 8 to further lower its temperature by heat exchange with the processed stream in conduit 1. Properly designed, the various cooling structures of the system will result in delivery of the regeneration gas to separator 9 at a temperature at which condensation of the desirable hydrocarbons and water will take place.

In separator 9 the condensed hydrocarbons and water are collected separately and removed separately. The gas which is not condensed is, of course, quite lean without the water and hydrocarbons removed from separator 9. The condensed hydrocarbons and water have been removed from the main stream to the beds, from the beds to the regeneration stream and from the regeneration stream to the separator 9. The bed, heated by the regeneration stream must now be cooled to a temperature at which it will again absorb hydrocarbons and water from the main stream.

The uncondensed gas from separator 9 may be returned directly to heater 6 through motor-compressor 10 and heat exchanger 11. Heat exchanger 11 is effective in conserving the heat extracted from a bed in raising its adsorptive capacity by cooling. As will be explained in more detail, heat from a bed 16, extracted by gas in conduit 17 can be flowed into the gas conduit 5 by heat exchanger 11. Heat exchanger 11 is located in conduit 5 just before heater 6, so heat placed in conduit 5 at this point reduces the heat input required of heater 6.

The process.—Cooling the bed

The heated, regenerated bed 4 may be cooled in various ways. The simplest way would be to disconnect the tower containing the bed 4 and let its heat be removed by convection. However, the fastest manner of cooling includes the positive, dynamic technique of passing a stream of gas through the bed which is cool enough to power the temperature of the bed to the desired level for adsorptive service. At least two gas streams are available for this function in the disclosed system.

The gas from separator 9 is cool enough for this bed-cooling service. If heater 6 is effectively disconnected from conduit 5 the gas will pass from separator 9 to bed 4 and lower the bed temperature. By-pass valve 15, and the conduits connected to it, will provide this source of cool gas to bed 4. However, the time required for cooling a bed may so closely match the time required to heat a bed that in this three-bed system there may be little or no time available for cooling bed 4 with the gas of separator 9 before it became necessary to reconnect the beds into the circuits to keep the process continuous. Besides it is highly desirable that stripped main stream gas in conduit 17 be used to complete the cooling of each bed to gain the particular advantages of tail gas cooling.

On the other hand, if bed 4, charged with the relatively rich load of gas in the regeneration circuit is connected to the tail gas, the heavy hydrocarbons charging the tower will be swept on into the downstream conduit 1, the result will be as initially outlined. The hydrocarbon dew point of the downstream gas will be raised by the escaping hydrocarbons which are recoverable. The maximum quantity of hydrocarbons will not, therefore, be recovered from the main stream. This problem is overcome by the present invention providing a purge system whereby the hydrocarbons left in the tower by regeneration will be recycled in the regeneration conduit 5. Once the hot regenerated tower is purged, it may be completely cooled by tail gas and its adsorptive capacity maintained at the high level attainable with the lean characteristic of tail gas.

As with conduits 1 and 5, conduit 17 is supplied with valved manifolds for selection of the tower through which its cooling gas stream is directed. A portion of the processed natural gas stream in conduit 1 is split-off, into conduit 17, for the cooling of the tower heated, and perhaps partially cooled, by the recycled regeneration gas in conduit 5. Conduit 17 is illustrated as coming directly from conduit 1, going to the bed in tower 16 and going back to conduit 1.

Between the two points of connection between conduit 17 and conduit 1, a valve 18 is mounted in conduit 1 with which a differential of pressure is established. Regulation of this valve 18 determines the size of the portion of tail gas in conduit 1 which is shunted through conduit 17 to complete the cooling of tower 16. After cooling tower 16, the stream of conduit 17 may heat exchange with the stream of conduit 5 in exchanger 11 to scavenge its heat and keep the final temperature of the main stream within limits.

The process.—Purging the bed

The heated bed 4 may be cooled by the separator gas 9 of conduit 5, the tail gas of conduit 17 or a combination of them both. However, the present invention is concerned with the charge of recoverable hydrocarbons left in bed 4 before the tail gas of conduit 17 is applied to sweep them into conduit 1, downstream of the process.

To carry out the inventive concept, the cooling step is carried out in two parts. The first part is not only a cooling step, but a purging operation. As bed 4 is heated, brought up to a regeneration temperature by the gas flowing from heater 6, it is disconnected from its position in conduit 5 between heater 6 and cooling exchanges 7 and 8. Bed 4 is then reconnected to conduit 5, but between heater 6 and motor-compressor 10. Bed 3 is connected in conduit 5, after heater 6. Therefore, for the period of purge time, conduit 5 passes through two beds in series, the heater 6 between them.

The relatively lean and cool gas stream from separator 9 passes through bed 4 to both reduce its temperature and flush recoverable hydrocarbons from bed 4 which had been left there by the heated, saturated regeneration stream of conduit 5. After a predetermined purge time, bed 4 is disconnected from conduit 5 and connected to conduit 17 for the completion of its cooling with the relatively lean tail gas.

To specifically carry out the shift of bed 4 in conduit 5, a three-way valve 19 is placed in conduit 17 upstream of heat exchanger 11. Conduit 17 from the bed in the position shown for bed 16, may then pass its gas into conduit 5 just upstream of heater 6. A three-way valve 19A is placed in conduit 5 just downstream of motor-compressor 10. Conduit 5 from downstream of separator 9 may then pass its gas into conduit 17 just upstream of the bed in the position shown for bed 16. Therefore, with valves 19 and 19A actuated, the gas of separator 9 will pass through bed 4 and purge its charge of gas back into the regeneration circuit to recycle its recoverable hydrocarbons. Once purged, the bed 4 is connected to conduit 17 for the tail gas cooling benefits.

Check valve 19B is provided in conduit 17 downstream of the conduit 17 connection with conduit 1. So placed, check valve 19B will prevent the loss of regeneration gas to the main stream when valve 19A is actuated to connect conduits 17 and 5 together.

SUMMARY OF PROCESS

The over-all operation of the process illustrated in FIGS. 1 and 2 is quite clear if it initially appreciated that three separate circuits are established for each of the beds in the three towers. The first circuit in conduit 1, brings the main stream of natural gas into contact with the bed of tower 3 for absorbing liquefiable components from the stream. The second circuit, in conduit 5, initially provides a heated medium for elevating the temperature of the bed until the liquefiable components are vaporized and removed by the heated medium. The second circuit may then be bypassed around its heater to start cooling the bed. The bed is then shifted in its position in the second circuit to purge the charge of gas in the bed with a cool, lean portion of the second circuit in preparation to cooling the bed with the stripped gas of the first circuit. The third circuit, in conduit 17, provides a relatively lean and cool stream for reducing the temperature of the heated bed until its adsorptive capacity is raised sufficiently high for adsorption service in the main stream.

The control system.—Generally

FIG. 2 illustrates the various segments of the control system for the process of FIG. 1. One segment controls the energy transfer from the main stream to the heating stream in the closed circuit. Another segment controls the valving of the three intake and discharge manifolds, the reconnect 3-way valves and heater bypass valve in order that each bed will process, heat, purge and cool in a desired sequence and for a desired length of time. Another segment monitors the temperature of the cooled bed to prevent the continuation of automatic cycling of the manifold valves which will return the cooled bed to process service until the cooled bed is reduced to the proper temperature for adsorption. Finally, a control segment is provided for a portion of the tail, or processed, gas to be split-off for cooling to keep the temperature of the processed natural gas stream discharged from the system below a predetermined maximum.

The control system.—Regeneration circuit

The control of the process of FIG. 1 begins with an understanding of the regulation of the power transfer from the main flow stream to the closed, or recycled, regeneration stream. Differential control valve 20 is placed in conduit 1 and a bypass conduit 21 around valve 20 is connected to the motor section of motor-compressor 10. Regulation of valve 20 then establishes the differential in conduit 1 which controls the amount of main stream gas shunted through conduit 21 and, therefore, the speed of motor-compressor 10.

Differential valve 20 is regulated by the flow in the closed circuit. The flow in conduit 5 of the closed circuit is detected by restriction 22 which may be in the form of an orifice plate which creates a differential of pressure across itself. The differential across orifice 22 is applied to a force balance control relay 23. Control relay 23 establishes an output which is applied to a set point controller 24. The output of set point controller 24 is indicated in the form of a fluid pressure which is applied to the diaphragm of valve 20. This general control of differential valve 20 from orifice 22, as a primary element, is disclosed in Fontaine et al. S.N. 740,144, filed June 5, 1958. A more specific disclosure of this control system, incorporating units equivalent to controller 23 and 24, is in Baker, 2,957,544.

Orifice 22 is exposed to the variation in the flowing temperature of the recycled regeneration stream in conduit 5. The resulting variation in the differential pressure across orifice 22 results in regulation of valve 20 in the correct direction to vary the flow rate in conduit 21. A decrease of the flowing temperature in conduit 5 causes an increase of flow rate in conduit 21. Increase of the flowing temperature in conduit 5 causes a decrease of flow rate in conduit 21. Thus, there is an automatic regulation of valve 20 in the correct direction to maintain the flow rate required by set point controller 24.

The supply of gas for the regeneration circuit may be from a source whose pressure difference with the main stream is low enough to avoid mechanical disturbance of the beds of the towers as the towers are switched between the circuits.

It is convenient to utilize the main stream of gas to be processed as the source. A communicating pipe 26 is shown between conduit 1 downstream of valve 20 and conduit 5 downstream of motor-compressor 10. It may be deirable to establish a maximum flow rate through pipe 26. A valve 27 in pipe 26 represents a means of establishing this control. Obviously, the pipe 26 could be connected between other points in conduits 1 and 5 to equalize the pressure between the two circuits.

The control system.—Manifold valves and heater bypass

Manifolds for conduits 1, 5 and 17 have been provided so that each conduit may be connected to each of the three beds 3, 4 and 16. Basically, the three conduits are connected to the three beds, through these manifolds, on a time-cycle basis. A time-cycle controller 25 has been illustrated as connected separately to each of the three intake manifold valves and to each of the three discharge manifold valves of the conduits, 3-way valves 19 and 19A, and the heating-cooling valve 15. A time-cycle mechanism suitable for this purpose is also illustrated in Baker 2,957,544. Through this time-cycle controller the intake manifold of each conduit is valved at the same time the output manifold for the same conduit is valved.

Time-cycle controller 25 could be either an electric or the mechanical-pneumatic type illustrated in Baker 2,957,544. If the mechanical-pneumatic type, its cams can be readily shaped so as to actuate valve 15 before the three manifolds are valved to switch the towers. In this manner the cooling of the bed of tower 4 is started with the closed regeneration circuit of conduit 5 bypassing heater 6. Additional cams can readily actuate valves 19 and 19A to carry out the purge. The cooling is then completed with the gas of conduit 17. Each of the three manifolds are valved simultaneously, by controller 25, to effectively pass the towers from the left to the right in the system as illustrated in FIGS. 1 and 2.

The control system.—Cooling tower temperature monitor

The cooling of bed 16 must be carefully monitored to prevent the bed from being placed back into adsorption service before its adsorptive capacity is raised to an effective level. The cooling function is guarded by placing temperature responsive element 30 in the output manifold of conduit 17.

A simple, filled, system is connected to element 30, including expansible bellows 31. A three-way, snap-acting fluid pressure valve 32 is actuated by bellows 30 to develop a fluid pressure output. This output is applied to controller 25 to block its output actuating impulses to the manifold valves until the temperature of the bed 16 is low enough to insure the adsorptive capacity of the bed is high enough to give proper processing service to the main stream.

The control system.—Cooling circuit

Time-cycle controller 25 may be readily arranged to initiate the cooling of a bed, in the position of tower 4, a finite period of time before repositioning the bed in the conduit 5. Bypass valve 15 is positioned so the gas in conduit 5 does not pass through heater 6, but is diverted around this unit. In this way, the gas from the separator 9 is used to start cooling the bed in tower 4. The bed is then reconnected to conduit 5 ahead of heater 6 to purge its charge of relatively rich gas into the regeneration circuit. The tail gas of conduit 17 is then passed through the bed to complete its cooling.

The main gas stream in conduit 1 is heated by the regeneration gas of conduit 17 as the gas returns from cooling tower 16. There are several reasons why the final temperature of this main stream should be kept below a predetermined value. To monitor this final temperature, responsive element 35 is placed in conduit 1, downstream of both valve 18 and the connections of conduit 17 with conduit 1.

FIG. 2 illustrates how temperature responsive element 35 is readily made a part of a filled system including bellows 36. Bellows 36 is arranged to oppose spring 37 in a position-balance system whose fluid pressure output controls valve 18. A force-balance/set point controller combination similar to 23 and 24 may, of course, be employed for control of the valve 18. Whichever system of control is employed, valve 18 is to be controlled from the temperature at 35 to regulate the portion of the processed gas diverted into conduit 17, from conduit 1. In general, the cooler the processed gas, the more valve 18 will be regulated toward its closed position by the position-balance controller. If the final temperature of the gas in conduit 1, as detected by temperature element 35, rises too high for the specifications set by the many considerations of the delivery point, valve 18 will be opened to permit the gas to come directly from exchanger 8. Therefore, less heat will come from tower 16 and the temperature of the gas leaving the process through conduit 1 will be kept within predetermined limits.

As the gas of conduit 17 leaves tower 16, it may be heat exchanged with conduit 5, by exchanger 11. Some of the heat of tower 16 will, thereby, be scavenged back into the system to relieve the heat load of heater 6 and return a cooler gas to the main stream whose temperature is monitored.

CONCLUSION

In one aspect, the invention serves to reduce the temperature of a regenerated bed of adsorbent material with the supply of gas of the process most readily available and offering the smallest opportunity for pre-loading the bed with the very materials it is to remove from the processed gas. The processed gas itself is the choice. However, before application of this processed gas to the cooling function, the bed is purged of the relatively rich gas of the heated portion regeneration stream by the cool and relatively lean portion of the regeneration stream. The result is to preclude passing recoverable hydrocarbons into the main gas stream downstream of the unit by the use of the tail gas in cooling.

The problems of controlling the conducting of the tail gas have been disclosed. The basic time-cycle control of the bed switching, modified, monitored and supplemented by final bed temperature and final temperature of the processed gas has been carefully set forth. The automatic continuous operation of a hydrocarbon recovery unit is obviously possible in accordance with this disclosure.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. The method of removing water and recovering condensable hydrocarbons from a main flow stream of natural gas which includes;

contacting a first bed of adsorbent material with the main flow stream of natural gas, whereby water and condensable hydrocarbons are adsorbed from the main flow stream by the bed material;

heating a reactivating flow stream of natural gas, whereby the vaporizing capacity of the reactivating flow stream is raised;

contacting the first bed of adsorbent material with the heated reactivating flow stream and diverting the main flow stream to a second bed of adsorbent material;

cooling the reactivating flow stream to its dew point as the stream flows from the heated bed, whereby water vaporized from the bed is removed and condensable hydrocarbons are recovered;

purging the first bed of adsorbent material into the reactivating flow stream with a stream of gas which is no more saturated than the cooled reactivating flow stream after condensables are removed while the heated reactivating flow stream is simultaneously passed through the second bed and the main flow stream is diverted to a third bed;

contacting the first bed of adsorbent material with at least a portion of the main flow stream after the entire main flow stream has been processed by contact with adsorbent material and after the first bed has been purged, whereby the first bed is cooled to a temperature at which it can again process the main flow stream;

and returning the first bed to processing the main flow stream while purging the second bed and simultaneously heating the third bed with the heated reactivating flow stream.

2. A system for removing water and recovering condensable hydrocarbons from a main flow stream of natural gas which includes, a first bed of adsorbent material, a first circuit for the main flow stream of natural gas which circuit is adapted to be connected to a bed of adsorbent material to process the gas stream by removing water and condensable hydrocarbons from the gas stream, a second bed of adsorbent material, a second circuit for a reactivating flow stream of gas which circuit is adapted to be connected to a bed of adsorbent material, a third bed of adsorbent material, a third circuit for at least a portion of the main flow stream after it has been processed by a bed which circuit is adapted to be connected to a bed of adsorbent material, means for heating the gas of the second circuit to raise its vaporizing capacity, means for cooling the gas of the second circuit down to its dew point after it has passed through a bed to remove water and recover hydrocarbons, means for connecting the first bed into a position in the second circuit where the heater gas of the second circuit will pass through the first bed while the main flow stream in the first circuit is connected to pass through the second bed while the third bed is connected to the third circuit and then connecting the first bed to gas no more saturated than the cooled gas of the second circuit so the gas will pass pass through and purge the first bed into the reactivating flow stream when the second bed is connected into the position in the second circuit where the heated gas of the second circuit will simultaneously pass through the second bed, and means for connecting the purged first bed into the third circuit so the portion of the main stream flow in the third circuit will cool the first bed enough that the bed will process the main flow stream while the second and third beds are connected to the circuits as was the first bed.

3. The method of removing water and recovering condensable hydrocarbons from a main flow stream of natural gas which includes;

contacting a first bed of adsorbent material with the main flow stream of natural gas, whereby water and condensable hydrocarbons are adsorbed from the main flow stream by the bed material;

heating a reactivating flow stream of natural gas, whereby the vaporizing capacity of the reactivating flow stream is raised;

contacting the first bed of adsorbent material with the heated reactivating flow stream and diverting the main flow stream to a second bed of adsorbent material;

cooling the reactivating flow stream to its dew point as the stream flows from the heated bed, whereby water vaporized from the bed is removed and condensable hydrocarbons are recovered;

purging the first bed of adsorbent into the reactivating flow stream with a stream of gas which is no more saturated than the cooled reactivating flow stream after the condensates are removed while the heated reactivating flow stream is simultaneously passed through the second bed and the main flow stream is diverted to a third bed;

diverting at least a portion of the main flow stream after the stream has water and hydrocarbons adsorbed from its by a bed of adsorbent material;

cooling the first bed of adsorbent material with the diverted portion of the main flow stream after the first bed has been purged while the second bed of adsorbent material is simultaneously contacted with the heated reactivating flow stream and the main flow stream is diverted to the third bed of adsorbent material;

returning the diverted portion of the main flow stream to the undiverted remainder of the main flow stream;

sensing the temperature of the main flow stream after the diverted portion has cooled the first bed and returned to the main flow stream;

utilizing the temperature of the mixture of the main flow stream and diverted portion to regulate a differential pressure in the main flow stream to control the size of the diverted portion of the main flow stream which cools the first bed;

and returning the first bed to processing the main flow stream while the second bed is purged and then cooled with the diverted portion of the main flow stream and the third bed is contacted with the heated reactivating flow stream.

4. A system for removing water and recovering condensable hydrocarbons from a main flow stream of natural gas which includes;

a first bed of adsorbent material;

a first circuit for the main flow stream of natural gas adapted to be connected to the first bed of adsorbent material to process the gas stream by removing water and condensable hydrocarbons from the gas stream, a second circuit for a reactivating flow stream of gas;

a heater for the reactivating flow stream;

a second bed of adsorbent material;

means for disconnecting the first circuit from the first bed and connecting the second circuit to the first bed, whereby the heated reactivating flow stream vaporizes the water and condensable hydrocarbons from the first bed;

means for cooling the reactivating flow stream in the second circuit down to the dew point of the stream after the heated stream has flowed through the first bed, whereby water and condensable hydrocarbons vaporized from the first bed are removed and recovered;

means for connecting the first bed to gas no more saturated than the reactivating flow stream after it has been cooled and connecting the second bed to the second circuit so as to purge the heavy hydrocarbons left in the first bed by the heated reactivating flow stream back into the heated second circuit while the second bed is simultaneously heated by the hot reactivating flow stream, whereby the heated reactivating flow stream vaporizes the water and condensable hydrocarbons from the second bed, a third circuit connected to the first circuit across a modulating valve in the first circuit, which valve is located in the first circuit downstream of the connection of the first circuit with the beds;

a third bed of adsorbent material;

means for connecting the third bed to the first circuit and connecting the third circuit with the first bed while the second circuit remains connected with the second bed, whereby the first bed is cooled and thereby prepared for connection to the first circuit to remove water and hydrocarbons from the main flow stream by adsorption;

temperature responsive means in the first circuit downstream of the connection across the modulating valve in the first circuit;

a temperature controller adjusted by the temperature responsive means to develop a control signal for the modulating valve, whereby the size of the stream in the first circuit diverted into the third circuit by the differential pressure across the modulating valve is regulated by the temperature of the mixture of the main flow stream and diverted portion which cools the first bed;

and means for reconnecting the first circuit to the first bed while the second bed is connected to the third circuit after the second bed is purged and the third bed is connected to the second circuit to heat the third bed before the third bed is purged.

5. The method of removing water and recovering condensable hydrocarbons from a main flow stream of natural gas which includes;

contacting a first bed of adsorbent material with the main flow stream of natural gas, whereby water and condensable hydrocarbons are adsorbed from the main flow stream by the bed material;

heating a reactivating flow stream of natural gas, whereby the vaporizing capacity of the reactivating flow stream is raised;

contacting the first bed of adsorbent material with the heated reactivating flow stream and diverting the main flow stream to a second bed of adsorbent material;

cooling the reactivating flow stream to its dew point as the stream flows from the heated bed, whereby water vaporized from the bed is removed and condensable hydrocarbons are recovered;

interrupting the heating of the reactivating flow stream after the first bed has had its adsorbed water and condensable hydrocarbons vaporized by the reactivating flow stream without shifting the position of the first bed in its position in the reactivating flow stream, whereby the cooling of the bed is initiated in preparing the bed to be again contacted with the main flow stream of natural gas to remove water and condensable hydrocarbons therefrom;

purging the first bed into the reactivating flow stream with a stream of gas which is no more saturated than the cooled reactivating flow stream after the condensates are removed; resuming heating of the reactivating flow stream;

diverting the resumed heated reactivating flow stream to the second bed while the first bed is purged;

diverting the main flow stream to a third bed;

contacting the first bed with at least a portion of the main flow stream after the main stream has been processed by contact with adsorbent material while maintaining the heated reactivating flow stream in contact with the second bed and the main flow stream in contact with the third bed;

and returning the first bed to processing the main flow stream while simultaneously contacting the second bed with the cooled reactivating flow stream and heating the third bed with the heated reactivating flow stream.

6. A system for removing water and recovering condensable hydrocarbons from a main flow stream of natural gas which includes;

a first bed of adsorbent material, a first circuit for the main flow stream of natural gas which circuit is adapted to be connected to a bed of adsorbent material to process the gas stream by removing water and hydrocarbons from the gas stream, a second bed of adsorbent material, a second circuit for a reactivating flow stream of gas which circuit is adapted to be connected to a bed of adsorbent material, a third bed of adsorbent material, a third circuit for at least a portion of the main flow stream after it has been processed by a bed which circuit is adapted to be connected to a bed of adsorbent material, means for heating the gas of the second circuit to raise its vaporizing capacity, means for connecting the first bed to the first circuit to process the main flow stream, means for connecting the second bed to the second circuit so the second bed will be heated, means for cooling the gas of the second circuit down to its dew point after it has passed through the second bed to remove water and recover hydrocarbons, means with which to interrupt the heating of the gas of the second circuit after water and condensible hydrocarbons have been vaporized from the second bed, whereby the gas of the second circuit then becomes a cooling medium for the second bed for a finite period of time in preparing the second bed to be again contacted by the main flow stream to remove water and condensable hydrocarbons therefrom, means for again heating the gas of the second circuit, means for passing a gas no more saturated than the cooled gas of the second circuit from which water and hydrocarbons have been recovered through the second bed to purge the second bed of relatively heavy hydrocarbons left in the bed from the heating into the second circuit, means for connecting the second bed in the third circuit to complete the cooling of the bed, means for connecting the third bed to the first circuit, means for shifting the first bed into the second circuit so the initially heated gas of the second circuit will pass through the first bed while the main flow stream is passed into the third bed and then so the gas of the second circuit will pass through the first bed during the interruption of heating, whereby the gas of the second circuit then becomes a cooling medium for the first bed for a finite period of time in preparing the first bed to be again contacted by the main flow stream of natural gas to remove water and condensable hydrocarbons therefrom, means for purging the first bed into the second circuit while the again heated gas of the second circuit passes through the third bed, and means for shifting the first bed into the third circuit so the portion of the main flow stream in the third circuit will complete the cooling of the first bed to prepare it to process the main flow stream while the other beds continue to follow the cycle of the sequential connection to the circuits.

7. The method of removing water and recovering condensable hydrocarbons from a main flow stream of natural gas which includes;

contacting a first bed and a second bed and a third bed of adsorbent material with the main flow stream of natural gas on a predetermined time-cycle basis, whereby water and condensable hydrocarbons are adsorbed by the material of the beds;

heating a reactivating flow stream of natural gas, whereby the vaporizing capacity of the reactivating flow stream is raised;

contacting the first bed of adsorbent material with the heated reactivating flow stream while diverting he main flow stream to a second bed of adsorbent material on a predetermined time-cycle basis;

cooling the reactivating flow stream as it flows from the first bed to its dew point, whereby water and condensable hydrocarbons vaporized from the first bed are removed and recovered;

purging the first bed into the reactivation flow stream with a stream of gas which is no more saturated than the cooled reactivating flow stream after the condensates are removed while simultaneously contacting the second bed with the heated reactivating flow stream while the main flow stream is diverted to a third bed on a predetermined time-cycle basis;

diverting at least a portion of the main flow stream after the stream has water and hydrocarbons adsorbed from it by the third bed of adsorbent;

terminating the purging of the first bed of adsorbent material on a predetermined time-cycle basis;

cooling the first bed of adsorbent material with the diverted portion of the main flow stream whereby the bed is prepared to be again contacted with the main flow stream of natural gas to remove water and hydrocarbons from the main flow stream by adsorption;

returning the diverted portion of the main flow stream to the undiverted remainder of the main flow stream;

sensing the temperature of the diverted portion of the main flow stream after the diverted portion has contacted the first bed;

utilizing the sensed temperature of the diverted portion of the main flow stream to adjust the time-cycle program to maintain the sensed temperature of the portion out of the cooled bed within a predetermined range;

sensing the temperature of the main flow stream after the diverted portion has cooled the first bed and returned to the main flow stream;

utilizing the temperature of the mixture of the main flow stream and diverted portion to regulate a differential pressure in the main flow stream to control the size of the diverted portion of the main flow stream which cools the first bed;

and returning the first bed to processing the main flow stream while the second and third beds are heated and cooled to regenerate them in the sequence followed with the first bed.

8. A system for removing water and recovering condensable hydrocarbons from a main flow stream of natural gas which includes;

a first bed of adsorbent material;

a first circut for the main flow stream of natural gas which circuit is adapted to be connected to the first bed of adsorbent material to process the gas stream by removing water and hydrocarbons from the gas stream, whereby the natural gas passing through the bed has its water and condensable hydrocarbons retained by the bed;

a second circuit for a reactivating flow stream of gas which circuit is adapted to be connected to a bed of absorbent material;

a heater for the reactivating flow stream to raise its vaporizing capacity;

a second bed of absorbent material;

a third bed of absorbent material;

a first set of valves for disconnecting the first circuit from the first bed and connecting the second circuit to the first bed downstream of the heater while the first circuit is connected to the second bed, whereby the heated reactivating flow stream vaporizes the water and condensable hydrocarbons from the first bed while the main flow stream is processed by the second bed;

means for cooling the reactivating flow stream down to its dew point in the second circuit after the heated stream has flowed through the first bed, whereby water and condensable hydrocarbons vaporized from the beds are removed and recovered;

a third circuit connected to the first circuit across a modulating valve in the first circuit which valve is located in the first circuit downstream of the connections of the first circuit with the beds, the third circuit thereby receiving a diverted portion of the main flow stream;

a second set of valves reconnecting the second circuit to the first bed in a position upstream of the heater while the second bed is simultaneously connected into the second circuit in a position downstream of the heater, whereby the first bed is purged by the cool reactivating gas upstream of the heater;

a third set of valves for disconnecting the second circuit from the first bed and connecting the third circuit with the first bed, whereby the first bed is cooled by the diverted portion of the main stream in the third circuit and thereby prepared for connection to the first circuit to remove water and hydrocarbons from the main flow stream by adsorption;

a fourth set of valves for disconnecting the third circuit from the first bed and reconnecting the first circuit to the first bed while the second and third beds are disconnected from the first circuit and connected to the second and third circuits in the sequence of the first bed connections;

a first temperature responsive means sensing the temperature of the diverted portion of the main flow stream in the third circuit after the diverted portion has contacted the first bed;

a time-cycle controller operating the first and second and third sets of valves between the beds and the three circuits to sequentially connect and disconnect the beds to the three circuits while monitored by the first temperature responsive means to initiate the operation of the time-cycle controller in operating the valves to connect the first circuit with the bed cooled by the third circuit gas when the temperature of the gas portion out of the cooled bed reaches a predetermined range;

a second temperature responsive means in the first circuit downstream of the connection across the modulating valve in the first circuit;

and a temperature controller adjusted by the second temperature responsive means to develop a control signal for the modulating valve, whereby the amount of the stream in the first circuit diverted into the third circuit by the differential pressure across the modulating valve is regulated by the temperature of the mixture of the main flow stream and diverted portion which cools the first bed.

References Cited by the Examiner

UNITED STATES PATENTS

| | | | |
|---|---|---|---|
| 2,919,764 | 1/1960 | Dillman et al. | 55—62 X |
| 3,124,438 | 3/1964 | Lavery | 55—62 X |

REUBEN FRIEDMAN, *Primary Examiner.*